(12) United States Patent
Zhang et al.

(10) Patent No.: US 11,539,481 B2
(45) Date of Patent: Dec. 27, 2022

(54) CLIENT STATION ARRANGED TO INDICATE A MAXIMUM NUMBER OF LONG TRAINING FIELD (LTF) SYMBOL TRANSMIT OR RECEIVE CAPABILITIES AND METHODS

(71) Applicant: NXP USA, Inc., Austin, TX (US)

(72) Inventors: Yan Zhang, Palo Alto, CA (US);
Sudhir Srinivasa, Los Gatos, CA (US);
Hongyuan Zhang, Fremont, CA (US);
Rui Cao, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 16 days.

(21) Appl. No.: 17/354,084

(22) Filed: Jun. 22, 2021

(65) Prior Publication Data

US 2021/0399850 A1 Dec. 23, 2021

Related U.S. Application Data

(60) Provisional application No. 63/042,633, filed on Jun. 23, 2020.

(51) Int. Cl.
*H04W 84/12* (2009.01)
*H04L 5/00* (2006.01)
*H04B 7/0452* (2017.01)

(52) U.S. Cl.
CPC ......... *H04L 5/0007* (2013.01); *H04B 7/0452* (2013.01); *H04W 84/12* (2013.01)

(58) Field of Classification Search
CPC .............................. H04W 84/12; H04L 5/0007

USPC ........................................................ 370/329
See application file for complete search history.

(56) References Cited

U.S. PATENT DOCUMENTS

2016/0057657 A1\* 2/2016 Seok .................... H04L 5/0007
370/476

OTHER PUBLICATIONS

IEEE Standards Draft P802.11-REVnd.D3.1, Feb. 2020, reference clauses 19.3.9.4.6 HT-LTF definition (p. 3020-3024) and 21.3.8.3.5 VHT-LTF definition (p. 3194-p. 3198).
IEEE Standards Draft P802.11 ax/D6.1, May 2020, reference clause 27.3.11.10 HE-LTF (p. 596-p. 612).

\* cited by examiner

*Primary Examiner* — Angel T Brockman

(57) ABSTRACT

A first device transmits to a second device a first data unit which indicates a maximum number of long training field (LTF) symbols that the first device transmits and receives for a multiple input multiple output communication. The first device receives, from the second device, a second data unit which comprises a plurality of LTF symbols up to the maximum number of LTF symbols the first device receives indicated by the first data unit. A channel estimation is performed based on the plurality of LTF symbols of the second data unit up to the maximum number of LTF symbols indicated by the first data unit to recover information in one or more fields of the second data unit. For the case when the second data unit is a trigger frame, the first device generates the third data unit with a plurality of LTF symbols up to the maximum number of LTF symbols the first device transmits indicated by the first data unit and transmits the third data unit.

20 Claims, 5 Drawing Sheets under the limitations imposed during the association even though the non-AP STA might be able to operate otherwise.

CLIENT STATION ARRANGED TO INDICATE A MAXIMUM NUMBER OF LONG TRAINING FIELD (LTF) SYMBOL TRANSMIT OR RECEIVE CAPABILITIES AND METHODS

RELATED APPLICATION

This application claims a benefit of priority to U.S. Provisional Application No. 63/042,633, entitled "Long Training field (LTF) transmit or receive capabilities for SU and UL/DL MU transmissions" filed Jun. 23, 2020, the contents of which are incorporated herein by reference in its entirety.

FIELD OF USE

This disclosure generally relates to wireless communication, and more particularly to a client station arranged to indicate a maximum number of long training field (LTF) symbol transmit or receive capabilities and methods.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, 802.11n, and 802.11ax has improved single user peak data throughput in the WLAN. Work continues on newer revisions to these standards that promises to provide even greater throughput.

Figure 1:
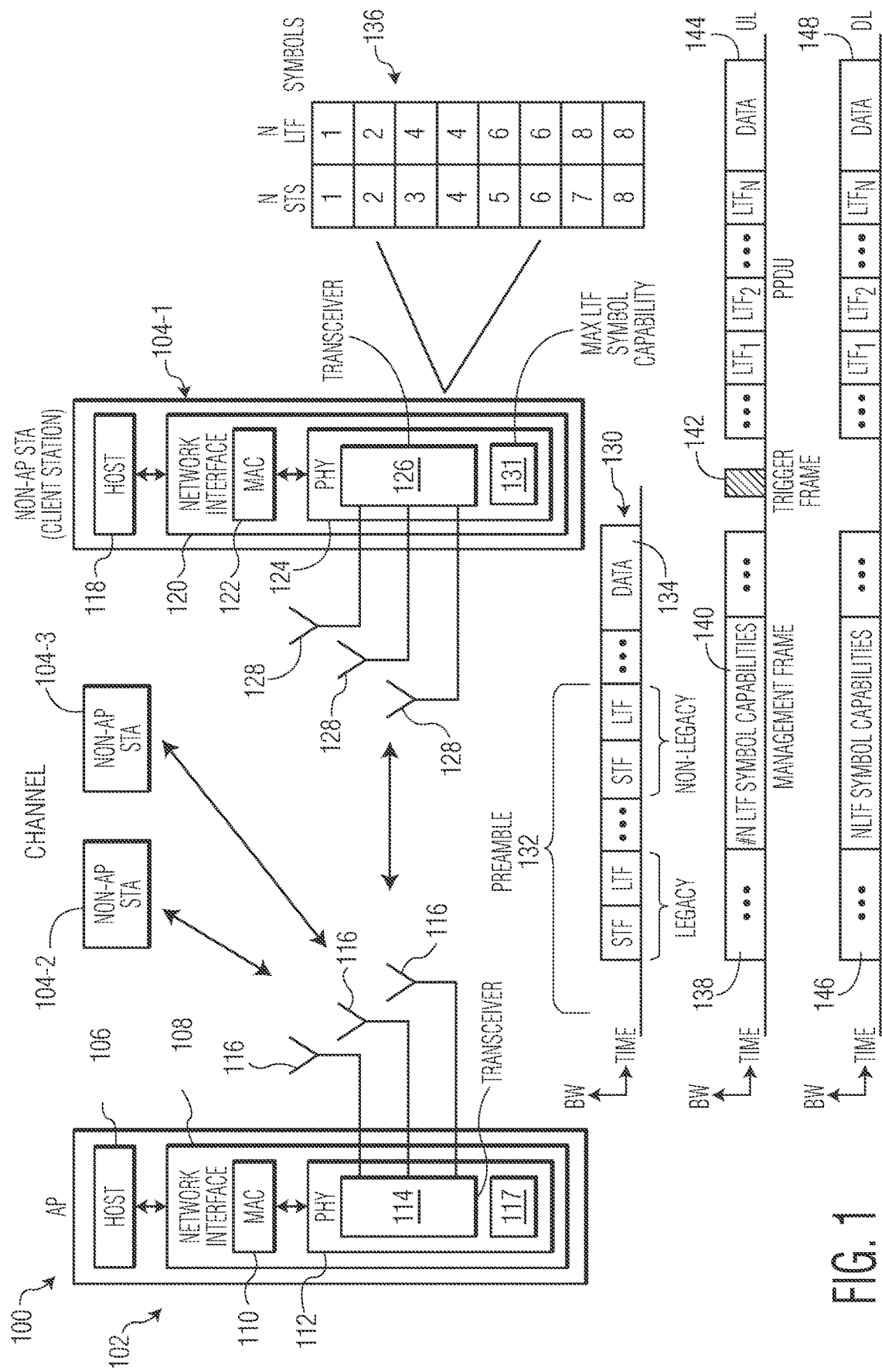
FIG. 1 is an example block diagram of an example communication system having an access point (AP) and non-AP client station (STA) to communicate a maximum number of long training field (LTF) symbol transmit or receive capabilities in accordance with exemplary embodiments.

The drawings are for the purpose of illustrating example embodiments, but it is understood that the embodiments are not limited to the arrangements and instrumentality shown in the drawings.

DETAILED DESCRIPTION

A communication system operating in accordance with WiFi based on the Institute of Electrical and Electronics Engineers (IEEE) 802.11 family of standards, specifically 802.11n, 802.11ac, and 802.11ax, defines various protocols for multiple-input-multiple-output (MIMO) communication. In MIMO communication, a device in the communication system such as an access point (AP) or non-AP client station (STA) each has a transmitter with multiple; transmit antennas to transmit space time streams and a receiver with multiple receive antennas to receive space time streams. The transmit antennas are each spatially separated from each other and similarly the receive antennas are each spatially separated from each other to leverage space diversity.

The space-time stream defines data transmitted over a spatial path from the transmit antenna to the receive antenna where portions of the data are replicated in time using a space block coding process to improve reception of the data. Different. space-time streams are transmitted over different spatial paths and if data in the space-time stream is not replicated, then the space-time stream is also referred to as a spatial stream. In one example, an AP sends a physical layer convergence procedure (PLCP) protocol data unit (PPDU) to the non-AP STA, with data in a data portion of the PPDU transmitted in one or more space-time streams. The PPDU has a physical layer (PHY) preamble having a long training field (LTF) with known orthogonal frequency division multiplexed (OFDM) symbols which allows the non-AP STA to estimate a channel over which the space-time streams are sent and accurately demodulate the data in the data portion of the PPDU. In another example, a non-AP STA sends a PPDU to the AP with data in a data portion of the PPDU transmitted in one or more space-time streams. The PPM has a PHY preamble having an LTF with known OFDM symbols which allows the AP to estimate a channel over which the space-time streams are sent and accurately demodulate the data in the data portion of the PPDU.

APs and non-AP STA (i.e., devices) generally support transmitting and receiving space-time streams ranging up to a maximum of four streams in 802.11n devices and up to a maximum of eight streams in 802.11ac and 802.11ax devices. If a device supports transmitting and receiving the maximum number of space-time streams, then the device is able to transmit a maximum number of LTF symbols to another device for channel estimation and receive a maximum number of LTF symbols from the other device for channel estimation. But not all devices such as the non-AP STAs support transmitting and receiving up to the maximum number of streams defined in the respective 802.11 standards so the non-AP STA advertises to the AP a maximum number of space time streams it is able to transmit or receive. For example, the maximum number of space-time streams is advertised in a PHY capability field of a management PPDU which announces capabilities of the non-AP STA during an association between the AP and non-AP STA. Based on the maximum number of space-time streams advertised, the AP maps the maximum number of space-time streams to the maximum number of LTF symbols that the AP can send in a PPDU to the non-AP STA or receive in a PPDU from the non-AP STA. In this case, the non-AP STA is limited to transmitting or receiving the maximum number of LTF symbols defined by the maximum number of space-time streams indicated during the association even though the non-AP STA might be able to receive or transmit a higher number of LTF symbols which would result in improved channel estimation. The non-AP STA transmits or receives the maximum number of LTF symbols if the number of space-time streams scheduled by the AP and indicated in a PPDU is the maximum number of streams. If a number of space-time streams scheduled by the AP and indicated in a PPDU is less than the maximum space-time streams, the non-AP STA is limited to transmitting or receiving a number of LTF symbols mapped from the number of space-time streams scheduled by the AP and indicated in the PPDU according to 802.11n, 802.11ac and 802.11ax standards. If the AP or non-AP STA is allowed to transmit the number of LTF symbols up to the maximum number indicated by the non-AP STA maximum space-time streams receive/transmit support, and the AP or non-AP STA performs a channel estimation based on the received LTF symbols in a PPDU, then additional LTF symbols (the number of LTF symbols exceeding the number required by the received space-time streams) would also improve the channel estimation quality.

Embodiments herein are directed to example systems, methods, techniques, and program flows associated with a non-AP STA indicating to an AP in a physical layer (PHY) capabilities field of a management PPDU during an association process between the AP and non-AP STA a maximum number of long training field (LTF) symbols that the non-AP STA is able to transmit or receive for a channel estimation process. The maximum number of LTF symbols is indicated for a type of multi-input multi-output (MIMO) communication such as orthogonal frequency division multiple access (OFDMA) communication or a non-OFDMA single user (SU) or non-OFDMA multi-user (MU) MIMO communication. In one example, the AP schedules the non-AP STA to receive one or more LTF symbols up to the maximum number of LTF symbols which the non-AP STA is able to receive in a PPDU. The LTF symbols transmitted by the AP and received by the non-AP STA is known to the non-AP STA. By the non-AP comparing the received LTF symbols to the known transmitted LTF symbols, the non-AP STA is able to estimate the channel between the AP and non-AP STA. In another example, the AP schedules the non-AP STA to transmit one or more LTF symbols up to the maximum number of LTF symbols which the non-AP STA is able to transmit in a PPDU. The LTF symbols transmitted is known to the AP STA. By the AP comparing the received LTF symbols to the known transmitted LTF symbols, the AP is able to estimate the channel between the AP and non-AP STA. If an AP transmits a PPDU with a maximum number of space-time streams that the non-AP STA supports, the AP can schedule the non-AP STA to receive or transmit more LTF symbols than would be result by mapping the maximum number of space-time streams indicated in the PPDU resulting in improved channel estimation. If an AP transmits a PPDU with a number of space-time streams which is less than the maximum number of space-time streams the non-AP STA supports, the AP can schedule the non-AP STA to receive or transmit more LTF symbols than would result by mapping the number of space-time streams indicated in the PPDU resulting in improved channel estimation. Well known instructions, protocols, structures, and techniques have not been shown in detail in order not to obfuscate the description.

FIG. 1 is an example block diagram of an example communication system 100 having one or more devices such as AP 102 and one or more non-AP STAs shown as non-AP STA 104-1 to 104-3 to communicate a maximum number of LTF symbol transmit or receive capabilities in accordance with an exemplary embodiment. The AP 102 is a device that allows other WiFi devices (e.g., client stations 104) to wirelessly connect to a wired network (not shown). The AP 102 and one or more non-AP STAs 104-1, 104-2, 104-3 exchange information based on multiple input multiple output (MIMO) techniques that exploit multipath propagation of signals between the AP 102 and non-AP STAs 104-1, 104-2, 140-3.

In one example, the MIMO technique uses an orthogonal frequency division multiple access (OFDMA) protocol where an AP 102 schedules one or more non-AP STAs to a resource unit that defines a plurality of orthogonal subcarriers used in downlink (DL) transmission and uplink (UL) transmissions of data between the AP 102 and the non-AP STAs 104 over a channel bandwidth. A transmission direction from the AP 102 to the non-AP STA 104 is referred to as DL whereas a transmission direction from the non-AP STA 104 to the AP 102 is referred to as UL. The channel bandwidth may be divided into several RUs each with a plurality of orthogonal subcarriers and associated with a respective non-AP STAs.

In another example, the MIMO technique may use non-OFDMA UL or DL multi-user (MU) transmissions. The non-OFDMA may mean that one RU spans an entire channel bandwidth or only one RU is assigned for transmission of data within entire channel bandwidth. The non-AP STAs which are considered "users" may use the RU to transmit data to the AP in a UL MU MIMO transmission and the AP may use the RU to transmit data to the non-AP STAs in a DL MU MIMO transmission.

In yet other example, the MIMO technique may use non-OFDMA UL or DL single-user (SU) transmissions. The non-OFDMA may mean that one RU spans an entire channel bandwidth or only one RU is assigned for transmission of data within entire channel bandwidth. A single non-AP STA may use the RU to transmit to the AP or the AP may use the RU to transmit to the single non-AP STA.

In an example, the AP 102 includes a host processor 106 coupled to a network interface 108. The network interface 108 includes a medium access control (MAC) unit 110 and a physical layer (PHY) unit 112. The PHY unit 112 includes a transceiver 114 associated with a plurality of RF chain (not shown) coupled to N antennas 116 which are spatially separated from each other. The transceiver may function as a transmitter or a receiver. In general, the AP 102 may include different numbers (e.g., 1, 2, 4, 5, 6, etc.) of antennas in other embodiments. The MAC unit 110 and the PHY unit 112 may be configured to operate according to a communication protocol generally similar to the IEEE 802.11 standard, for example.

The communication system 100 includes a plurality of non-AP STA. Although three non-AP STAs 104-1 to 104-3 are illustrated in FIG. 1, the communication system 100 can include different numbers (e.g., 1, 2, 3, 4, 5, 6, etc.) of non-AP STA 104 in various embodiments.

The non-AP STA 104-1 includes a host processor 118 coupled to a network interface 120. The network interface 120 includes a MAC unit 122 and a PHY unit 124. The PHY unit 124 includes transceiver 126 coupled to N antennas 128 which are spatially separated from each other. In general, the transceiver 126 may include different numbers (e.g., 1, 2, 4, 5, 6, etc.) of antennas 128 in other embodiments.

The devices in the communication system 100 may support communication using space-time streams where a space time stream is transmitted by one or more transmit antennas of the transceiver which function as a transmitter and received by one or more receive antennas of the transceiver which functions as a receiver. Further, a device may transmit up to a number of space time streams equal to a number of antennas and similarly a device may receive up to a number of space-time streams equal to a number of antennas. In an example, a beamforming precoders may be applied to the space-time data streams to produce beamformed transmissions in a desired direction.

In an example, the AP 102 and non-AP STA 104-1 may exchange a data unit 130 in the form of a PPDU which is transmitted or received in one or more space-time streams. The PPDU may have a channel bandwidth (BW) such as 20 MHz, 40 MHz, 80 MHz, 160 MHz, 320 MHz and is transmitted or received over time. The data unit 130 may include a physical layer preamble 132. The preamble 132 includes short training fields (STF) and long training fields (LTF). The STF may be a field of the PPDU which comprises STF orthogonal frequency division multiplexed (OFDM) symbols used to detect the presence of an incoming signal and to perform initial estimations of, for example, carrier frequency offset while the LTF may be a field of the PPDU which comprises LTF OFDM symbols used to perform channel estimation (i.e., an estimate of a channel transfer function from the transmitting antenna to a receiving antenna). The preamble 110 may have legacy STF (L-STF) and legacy LTF (L-LTF) and non-legacy STF and non-legacy LTF such as associated with high throughput (HT) capability in 802.11n, very high throughput (VHT) capability in 802.11ac, or high efficiency (HE) capability in 801.ax in examples. The preamble 110 may have other fields as well including one or more signaling (SIG) fields which contain information related to a type of communication (e.g., OFDFMA, MU-MIMO, SU-MIMO) associated with the data unit 130. Unless otherwise indicated, in the following text, LTF symbols may only apply to non-legacy LTF symbols. Also, unless otherwise indicated, in the following text, LTF fields may only apply to non-legacy LTF fields.

In an example, the PHY unit may perform channel estimation. In an example, the channel estimation is a determination of frequency characteristics of a channel in which a PPDU is transmitted or received. The channel estimation may be based on a first device transmitting the data unit 130 and a second device receiving the data unit 130. The LTF symbols in the non-legacy LTF field may be known to the second device which compares the LTF symbols which were received to what were transmitted to determine the channel estimate and to reliably recover information in fields of a PPDU. In some embodiments, a transmitting device generates data units that include the non-legacy LTF field but do not include the data portion and that are for "sounding" the channel to obtain channel state information (CSI) feedback from a second device such as beamforming precoders. These sounding data units are referred to herein as null data packets (NDPs).

Conventionally, the AP 102 schedules the non-AP STA 104-1 to receive a number of LTF symbols determined by a number of space-time streams that the non-AP STA 104-1 receives in a PPDU. Similarly, the AP 102 schedules the non-AP STA 104-1 to transmit a number of LTF symbols determined by a number of space-time streams that the non-AP STA 104-1 transmits in a PPDU. In examples, the non-AP STA 104-1 may advertise to the AP 102 a maximum number of space time streams it is able to transmit or receive. For example, the maximum number of space-time streams is advertised in a PHY capability field of a management PPDU during an association between the AP 102 and non-AP STA 104-1 to announce capabilities of the non-AP STA 104-1. Based on the maximum number of space-time streams advertised, the AP 102 maps the maximum number of space-time streams to a maximum number of LTF symbols that the AP can schedule the non-AP to transmit or receive. In examples, the AP 102 may store an example table 136 in memory which indicates based on the maximum number of supported space time streams ($N_{STS}$) the maximum number of LTF symbols ($N_{LTF}$) that the non-AP STA supports. For example, if the non-AP STA supports receiving up to 4 space-time streams, the table 136 indicates that the device receives up to four LTF symbols. As another example, if the non-AP STA supports receiving up to 6 space-time streams, the table 136 indicates that the non-AP STA receives up to six LTF symbols. Similarly, the AP may use the table 136 to determine a number of LTF symbols to schedule to transmit to a non-AP STA or schedule a non-AP STA to transmit to the AP when the AP schedules the non-AP STA in a PPDU to respectively transmit or receive a number of space-time streams.

In an example, the PHY unit 114 of the AP 102 may have a maximum LTF symbol TX/RX capability circuitry 117, and the PHY unit 124 of the non-AP STA 104-1 may have a maximum LTF symbol TX/RX capability circuitry 131. In examples, the maximum LTF symbol TX/RX capability circuitry 117 of the AP 102 and the maximum LTF symbol TX/RX capability circuitry 131 of the non-AP STA 104-1 may be implemented using circuitry such as analog circuitry, mix signal circuitry, memory circuitry, logic circuitry, processing circuitry arranged to execute code stored in a memory and when executed by the processing circuitry perform the disclosed functions, or combinations thereof. The maximum LTF symbol TX/RX capability circuitry 131 of non-AP STA 104 may allow the non-AP STA 105 to indicate a maximum number of LTF symbols transmit or receive capability of the non-AP STA 104-1. The maximum number of LTF symbols transmit or receive capability may be a maximum number of LTF symbols that the non-AP STA 104-1 is able to transmit or receive. The maximum LTF symbol TX/RX capability circuitry 117 of AP 102 may store multiple maximum number of LTF symbols transmit or receive capabilities advertised by the non-AP STAs 104.

The LTF symbol TX/RX capability circuity 131 may indicate the capability of the non-AP STA 104-1 in a PHY capabilities field 140 of a management PPDU 138. The PHY capabilities field 140 may be in a data portion of the PPDU 138 and indicate the capability as an integer N rather than the AP 102 determining the maximum number of LTF symbols that the non-AP STA 104 is able to transmit or receive based on the maximum number of space-time streams supported by the non-AP STA 104. In an example, N may be a maximum number of LTF symbols that the non-STA 104 may transmit or receive. In an example, the non-AP STA 104-1 may send the PPDU 138 to the AP 102 during the association with the AP to indicate the maximum number of LTF symbols that the non-AP STA 104-1 is able to transmit or receive in a PPDU. The PPDU 138 may not have any non-legacy fields or LTF symbols.

By providing the PPDU 138, the non-AP STA 104-1 may be able to indicate its capability to transmit more LTF symbols in a PPDU than would be determined based on the table 136 and a number of space-time streams scheduled by the AP for the non-AP STA to transmit. Furthermore, by the PPDU 138, the non-AP STA 104-1 may be able to indicate the maximum number of LTF symbols it is capable of transmitting in a PPDU which may be more than would be determined based the table 136 and a maximum number of space-time streams it is capable of transmitting. Also, by the PPDU 138, the non-AP STA 104-1 may be able to indicate its capability to receive more LTF symbols in a PPDU than would be determined based the table 136 and a number of space-time streams scheduled by the AP for the non-AP STA to receive. Furthermore, by the PPDU 138, the non-AP STA 104 may be able to indicate the maximum number of LTF symbols it is capable of receiving which may be more than would be determined based the table 136 and the maximum number of space-time streams it is capable of receiving. The AP 102 can schedule the non-AP STA to transmit more LTF symbols or schedule the non-AP STA to transmit more LTF symbols, resulting in improved channel estimation.

The IEEE 802.11 standard supports coordinated UL transmissions from multiple non-AP STAs 104 to the AP 102, initiated by the AP 102 broadcasting a special type of PPDU in a DL direction with a signaling (SIG) field indicating that the PPDU is a trigger PPDU. The trigger PPDU includes information for the non-AP 104 to send the coordinated UL transmission. For example, the AP 102 may send a trigger PPDU 142 to the non-AP STAs 104-1, 104-2, 104-3 to schedule the non-AP STAs to immediately transmit the PPDU 144 in response to the trigger PPDU 142. The trigger PPDU 142 may have an indication in a signaling (SIG) field (not shown) that causes the non-AP STA 104-1 to transmit the PPDU 144. For example, the non-AP STAs 104-1 which receive the trigger PPDU 142 may transmit a respective PPDU 144 to the AP 102 depending on the indication included in the trigger PPDU 142. The AP 102 may schedule the non-AP 104-1 to transmit one or more LTF symbols to the AP 102 in a PPDU 144 in a respective non-legacy LTF field up to the maximum number of LTF symbols N indicated that non-AP STA 104 is able to transmit. In an example, the trigger frame 142 may indicate in an associated SIG field a number of LTF symbols the non-AP STA is to transmit. The AP 102 may determine the number of LTF symbols based on the maximum number of LTF symbols the non-AP STA is able to transmit indicated in the association. Further, in an example, the trigger frame 142 may include one or more LTF symbols (not shown) transmitted to non-AP STAs 104-1, 104-2, 104-3 in a respective non-legacy LTF field up to the maximum number of LTF symbols N indicated that non-AP STA 104 is able to receive. Because the LTF symbols transmitted is known to the non-AP 104, the non-AP 104 may compare the received LTF symbol to the known transmitted LTF symbols and estimate the channel between the AP 102 and non-AP 104 using channel estimation techniques to recover information in various fields of the trigger frame 142 associated with transmitting PPDU 144. Also, because the LTF symbols transmitted in the PPDU 144 is known to the AP STA 102, the AP 102 may compare the received LTF symbol to the known transmitted LTF symbols and estimate the channel between the AP 102 and non-AP 104-1 using channel estimation techniques.

The IEEE 802.11 standard also supports coordinated DL transmissions from the AP 102 to multiple non-AP STAs 104, initiated by the AP 102. For example, the AP 102 may send a DL PPDU 148 to the non-AP STAs 104-1, 104-2, 104-3 which includes a SIG field in the preamble (not shown) containing information for the non-AP 104 to receive the coordinated DL transmission (and the PPDU 148 is not a trigger frame). The AP 102 may transmit one or more LTF symbols to non-AP 104 in the PPDU 148 in the respective non-legacy LTF field up to the maximum number of LTF symbols N indicated that non-AP STA 104 is able to receive. Because the LTF symbols transmitted is known to the non-AP 104, the non-AP 104 may compare the received LTF symbol to the known transmitted LTF symbols and estimate the channel between the AP 102 and non-AP 104 using channel estimation techniques to recover information in various fields of the PPDU 148 such as the data field.

Figure 2:
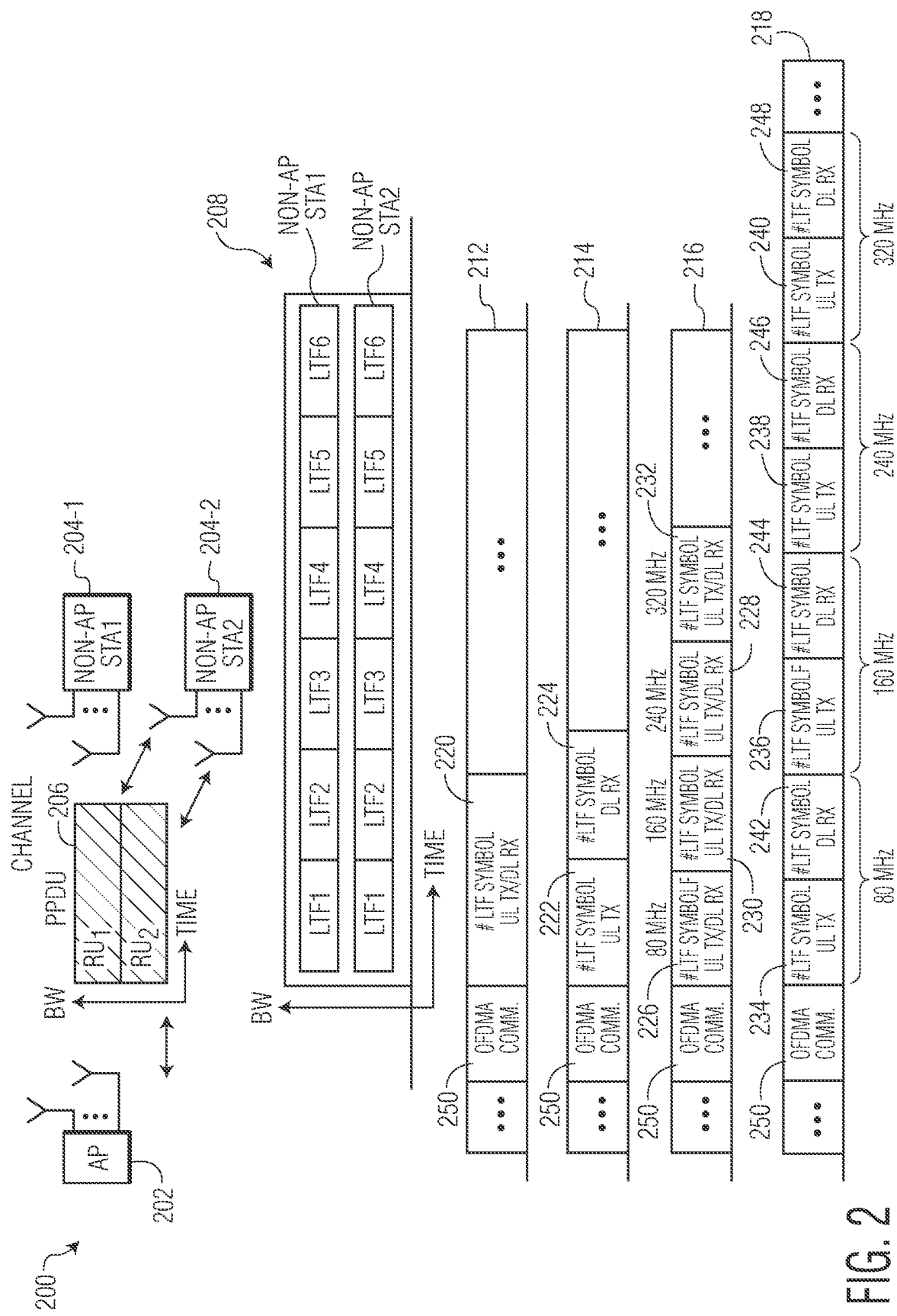
FIG. 2 is an example block diagram of an example communication system arranged to communicate a maximum number of LTF symbol transmit or receive capabilities for orthogonal frequency division multiple access (OFDMA) communication in accordance with exemplary embodiments.

FIG. 2 is an example block diagram of an example communication system 200 arranged to communicate a maximum number of LTF symbol transmit or receive capabilities for orthogonal frequency division multiple access (OFDMA) communication in accordance with exemplary embodiments. A PPDU 206 transmitted or received in a channel may comprise a plurality of orthogonal subcarriers of different frequencies to transmit or receive data and the plurality of subcarriers may be subdivided into one or more resource units. In OFDMA communication, an AP 202 assigns a resource unit of the PPDU 206 to one or more of the non-AP STA 204. The one or more non-AP STA 204 may transmit data to AP 202 or receive data from AP STA 202 simultaneously using the subcarriers of the assigned RU associated one or more space-time streams.

In an example, an AP 202 may assign two non-AP STA 204-1, 204-2 two different RUs in the OFDMA DL transmission. Non-AP STA1 204-1 may have a capability to receive data of $RU_1$ with up to four space-time streams while non-AP STA2 204-2 may have a capability to receive data of $RU_2$ with up to six or eight space-time streams. The AP 202 may schedule sending more than four and typically six to eight LTF symbols in an PPDU 208 to non-AP STA2 204-2 for non-AP STA2 204-2 to estimate the channel if AP 202 wants to schedule more than four space-time streams to transmit data to non-AP STA2 204-2 using $RU_2$ as shown by PPDU 208. Further, AP 202 has to send more than four and typically six to eight LTF symbols to non-AP STA1 204-1 as shown by PPDU 208 because LTF symbols needs to be aligned in time in the PPDU 208. If the AP 202 determines a number of LTF symbols that the non-AP STA1 204-1 and non-AP STA2 204-2 receives based on the maximum space-time stream support, then the AP 202 may determine that non-AP STA2 204-2 will not receive more than four LTF symbols in the PPDU 208 even though it may support receiving more, since non-AP STA1 204-1 is not able to receive more than four LTF symbols. Accordingly, non-AP STA1 204-1 may not be scheduled to receive data of $RU_1$ with up to four space-time streams and non-AP STA1 204-2 may not be scheduled to receive data of $RU_2$ with up to six or eight space-time streams. Similarly, if AP 202 schedules two non-APs 204 to transmit data in two different RUs and non-AP STA1 204-1 supports transmit up to four space-time streams and non-AP STA2 204-2 supports transmit up to eight space-time streams, then the AP 202 needs to schedule the non-AP STA1 204-1 and non-AP STA2 204-2 to transmit at least six to eight LTF symbols for channel estimation if AP 202 wants to schedule non-AP STA2 204-2 to transmit more than four space-time streams in the PPDU 208. If the AP 202 determines a number of LTF symbols that the non-AP STA1 204-1 and non-AP STA2 204-2 transmits based on the maximum space-time stream transmit capability, then the AP 202 may determine that non-AP STA2 204-2 may not transmit more than four LTF symbols in the PPDU 208 even though it may support transmitting more LTF symbols, since non-AP STA1 204-1 is not able to transmit more than four LTF symbols. Accordingly, non-AP STA1 204-1 may not be scheduled to transmit data of $RU_1$ with up to four space-time streams and non-AP STA1 204-2 may not be scheduled to transmit data of $RU_2$ with up to six or eight space-time streams.

In an example, the non-AP STA 204 may be able to indicate a maximum number of LTF symbols that the non-AP STA 204 is able to transmit or receive. A PPDU may be sent by the non-AP STA 204 to the AP 202 with a PHY capabilities field, e.g., during the association process between the AP 202 and non-AP STA 204 to exchange capabilities which indicates a maximum number of LTF symbols that the non-AP STA 204 is able to transmit in an UL OFDMA transmission of a PPDU and receive in a DL OFMDA reception of the PPDU and the PPDU may not have any LTF symbols or non-legacy LTF field. This way the non-AP 204 may indicate support for LTFs which is more than indicated by the maximum number of space-time streams support or number of space-time streams scheduled by the AP and indicated in a PPDU, which allows for improved channel estimation.

In an example, a PPDU 212 may have a capability subfield 220 with an indication of a maximum number of LTF symbols that the non-AP STA 204 is able to transmit in an UL OFDMA PPDU and to receive in a DL OFDMA PPDU for all supported bandwidths. The PPDU 212 may also have a field 250 which indicates the maximum number of LTF symbols is associated with an OFDMA communication. In an example, a PPDU 214 may have two capability subfields 222, 224, one which has an indication of a maximum number of LTF symbols that the non-AP STA 204 is able to transmit in an UL OFDMA PPDU and the other which has an indication of a maximum number of LTF symbols that the non-AP STA 204 is able to receive in a DL OFDMA PPDU, for all supported bandwidths. The PPDU 214 may also have a field 250 which indicates the maximum number of LTF symbols is associated with an OFDMA communication.

Furthermore, future generations of 802.11 PPDUs will support much wider bandwidth than current generation, e.g., 320 MHz or even wider. The number of LTF symbols that the non-AP STA 204 transmits or receives may depend on a channel bandwidth since wider bandwidth requires more processing. In an example, a PPDU 216 may have for each applicable channel bandwidth such as 80 MHz, 160 MHz/80+80 MHz, 240 MHz, or 320 MHz, capability subfields 226-232 which have an indication of a maximum number of LTF symbols that the non-AP STA 204 is able to transmit in an UL OFDMA PPDU and to receive in an DL OFDMA PPDU. The PPDU 216 may also have a field 250 which indicates the maximum number of LTF symbols is associated with an OFDMA communication. In another example, a PPDU 218 may have for each applicable channel bandwidth such as 80 MHz, 160 MHz/80+80 MHz, 240 MHz, or 320 MHz, capabilities subfields 234, 236, 238, 240 which have an indication of a maximum number of LTF symbols that the non-AP STA 204 is able to transmit in an UL OFDMA PPDU, and capabilities subfields 242, 244, 246, 248 which have an indication of a maximum number of LTF symbols that the non-AP STA 204 is able to receive in an DL OFDMA PPDU. The PPDU 218 may also have a field 250 which indicates the maximum number of LTF symbols is associated with an OFDMA communication.

In an example, one or more fields 220-248 may each have one bit where "0" indicates that a maximum of 4 LTF symbols that the non-AP STA 204 is able to transmit or receive while "1" indicates that a maximum of 8 LTF symbols that the non-AP STA 204 is able to transmit or receive. In another example, one or more fields 220-248 may have one bit where "0" indicates that a maximum number of LTF symbols indicated by the maximum number of space-time streams $N_{sts}$ that the non-AP STA 204 is able to transmit or receive, while "1" indicates that a maximum of 8 LTF symbols that the non-AP STA 204 is able to transmit or receive. In another example, one or more fields 220-248 may have two bits where "00" indicates that a maximum of 4 LTF symbols that the non-AP STA 204 is able to transmit or receive while "01" indicates that a maximum of 8 LTF symbols that the non-AP STA 204 is able to transmit or receive. Bits "11" and "10" may be reserved. Further, in some examples, one or more fields 220-248 may have a bit which indicates whether the non-AP STA 204 is able to transmit or receive additional LTF symbols from that indicated by the space-time streams scheduled by the AP and indicated in a PPDU followed by the indication of the maximum number of LTF symbols that the non-AP STA 204 is able to transmit or receive.

Figure 3:
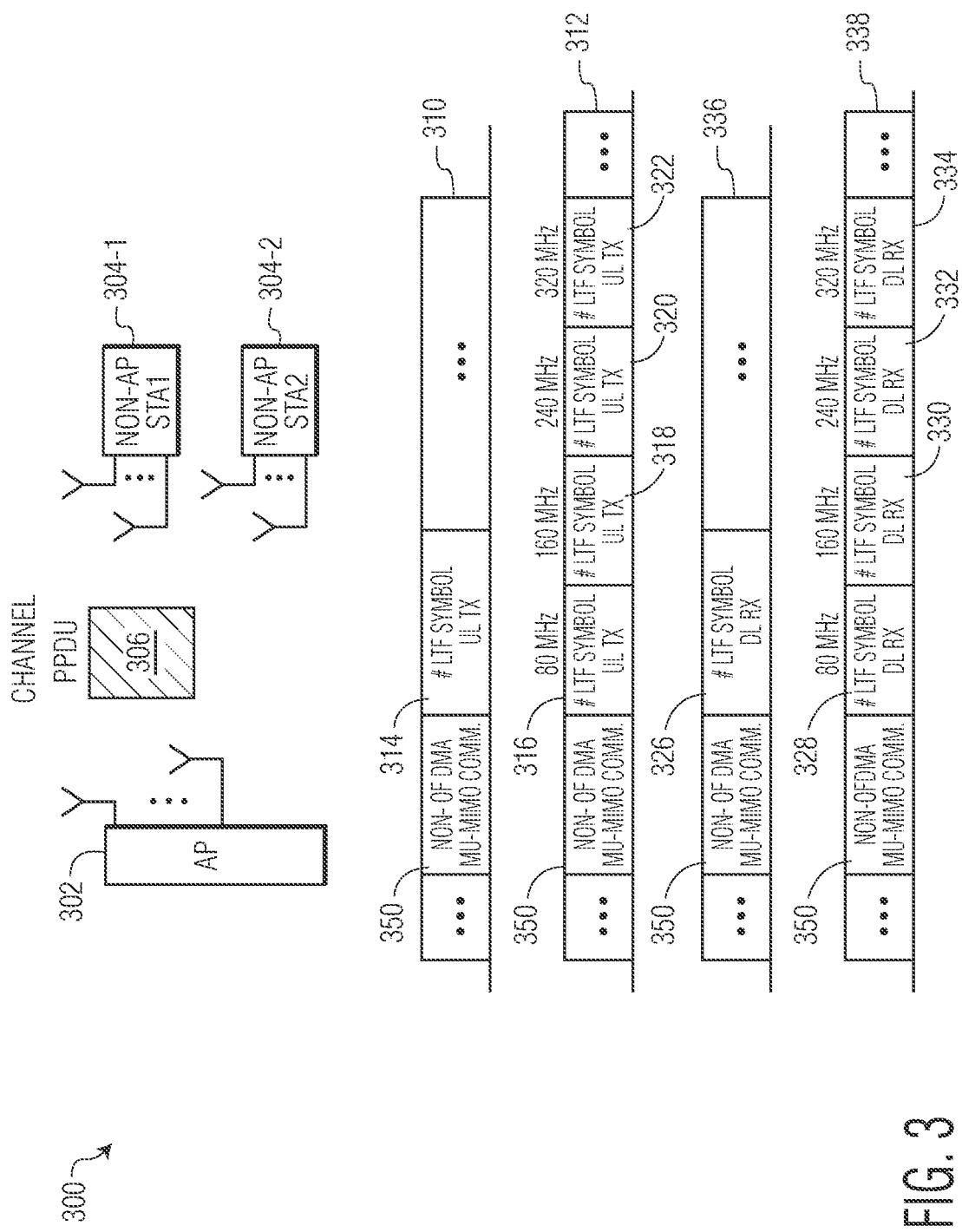
FIG. 3 is an example block diagram of an example communication system arranged to communicate a maximum number of LTF symbol transmit or receive capabilities for a full bandwidth non-OFDMA multiple user (MU) multiple-input-multiple-output (MIMO) communication in accordance with exemplary embodiments.

FIG. 3 is an example block diagram of an example communication system 300 arranged to communicate a maximum number of LTF symbol transmit or receive capabilities for a full bandwidth non-OFDMA multiple user (MU) MIMO communication in accordance with exemplary embodiments. The communication may include an AP 302 and two non-AP STAs 304-1, 304-2 with each non-AP STA transmitting or receiving data of a PPDU 306 in one or more space-time streams. The PPDU 306 associated with full bandwidth non-OFDMA MU communication may be transmitted using a single RU which is assigned to two or more non-AP STAs.

In an example, the non-AP STA 304-1 and 304-2 may support a full bandwidth non-OFDMA UL MIMO transmission of data in the PPDU 306 each using one or more space-time streams. If non-AP STAs 304-1 and 304-2 support the non-OFDMA UL MIMO transmission of data in the PPDU 306, the non-AP STAs 304-1 and 304-2 may have to transmit up to eight LTF symbols in an UL MU-MIMO transmission of the PPDU 306 for channel estimation based on the current 802.11ax specification. If the non-AP STA 304-1 or 304-2 is not able to transmit up to 8 LTF symbols, non-AP STA 304-1 or 304-2 has to claim it does not support non-OFDMA UL MU-MIMO transmission of data in the PPDU 306 during an association with the AP 302 and non-AP STA 304-1 or 304-2 may lose opportunities of getting scheduled by the AP 302 to transmit. Alternatively, non-AP STA 304-1 or 304-2 may still claim it transmits up to eight LTF symbols in an UL MU-MIMO transmission of the PPDU 306, although it does not support transmitting up to 8 LTF symbols in the PPDU 306. When AP 302 schedules the non-AP STA 304-1 or 304-2 to transmit a PPDU 306 as a non-OFDMA UL MU-MIMO transmission with 8 total number of space-time streams over all non-AP STAs, the non-AP STA 304-1 or 304-2 will not be able to transmit a correct PPDU format, hence resulting in packet loss.

In an example, the non-AP STA 304-1 or 304-2 may indicate a maximum number of LTF symbols the non-AP STA 304-1 or 304-2 is able to transmit in an non-OFDMA UL MU-MIMO PPDU. A PPDU may be sent by the non-AP STA 304-1 or 304-2 to the AP 302 with a PHY capabilities field which indicates a maximum number of LTF symbols that the non AP STA 304-1 or 304-2 is able to transmit in an non-OFDMA UL MU-MIMO PPDU and the PPDU may not have any non-legacy LTF field or LTF symbols. For example, a PPDU may be sent by the non-AP STA 304-1 or 304-2 to the AP 302 as part of an association process between the AP 302 and non-AP STA 304-1 or 304-2. The non-AP STA 304-1 or 304-2 may indicate support for a maximum number of LTF symbols which it is able to transmit which would be more than what would be determined based on the maximum number of space-time streams which the non-AP STA 304-1 or 304-2 supports for transmission or number of space-time streams scheduled by the AP and indicated in a PPDU.

In an example, a capability subfield 314 of PPDU 310 indicates a maximum number of LTF symbols that the non-AP STA 304-1 or 304-2 is able to transmit in a non- OFDMA UL MU-MIMO transmission for all supported bandwidths. The PPDU 310 may also have a field 350 which indicates the maximum number of LTF symbols is associated with a non-OFDMA MU-MIMO communication. In another example, for each applicable bandwidth such as 80 MHz, 160 MHz/80+80 MHz, 240 MHz, or 320 MHz, a capability subfield 316-322 of PPDU 312 may have an indication of a maximum number of LTF symbols that the non-AP STA 304-1 or 304-2 is able to transmit in a non-OFDMA UL MU-MIMO transmission for all applicable bandwidth. The PPDU 312 may also have a field 350 which indicates the maximum number of LTF symbols is associated with a non-OFDMA MU-MIMO communication.

In an example, one or more fields 314-322 may each have one bit where "0" indicates that a maximum of 4 LTF symbols that the non-AP STA 304-1 or 304-2 is able to transmit while "1" indicates that a maximum of 8 LTF symbols that the non-AP STA 304-1 or 304-2 is able to transmit. In another example, one or more fields 314-322 may have one bit where "0" indicates that a maximum number of LTF symbols indicated by the maximum number of space-time streams $N_{sts}$ that the non-AP STA 304-1 or 304-2 is able to transmit, while "1" indicates that a maximum of 8 LTF symbols that the non-AP STA 304-1 or 304-2 is able to transmit. In another example, one or more fields 314-322 may have two bits where "00" indicates that a maximum of 4 LTF symbols that the non-AP STA 304-1 or 304-2 is able to transmit while "01" indicates that a maximum of 8 LTF symbols that the non-AP STA 304-1 or 304-2 is able to transmit. Bits "11" and "10" may be reserved. Further, in some examples, one or more fields 314-322 may each have a bit which indicates whether the non-AP STA 304-1 or 304-2 is able to transmit or receive additional LTF symbols from that indicated by the space-time streams scheduled by the AP and indicated in a PPDU followed by the indication of the maximum number of LTF symbols that the non-AP STA 304-1 or 304-2 are able to transmit.

In an example, the non-AP STAs 304-1 and 304-2 may support a full bandwidth non-OFDMA DL MIMO reception of data in the PPDU 306 each using one or more space-time streams $N_{sts,1}$, $N_{sts,2}$. If a non-AP STAs 304-1 and 304-2 supports the non-OFDMA DL MIMO reception of the PPDU 306, the AP 302 may transmit up to $N_{sts}=\min(N_{sts,1}, N_{sts,2})$ space-time streams to non-AP STAs 304-1 and 304-2. The maximum total number of space-time streams $N_{sts}$ support for MU-MIMO transmission, $N_{sts}$ or $N_{sts,2}$ by each non-AP STA 304-1 or 304-2, may be indicated by the non-AP STA 304-1 or 304-2 in a management PPDU exchanged during an association between the AP 302 and non-AP STA 304-1 or the AP 302 and 304-2 where capabilities of the non-AP STA 304-1 or 304-2 is exchanged. A maximum number of LTF symbols that non-AP STA 304-1 or 304-2 is able to receive may be determined by mapping the maximum total number of space-time streams $N_{sts}$ which both the non-AP STA 304-1 and 304-2 is able to receive in a non-OFDMA DL MU-MIMO PPDU.

In an example, the non-AP STA 304-1 or 304-2 may be able to receive more LTF symbols than indicated by mapping the maximum number of space-time streams $N_{sts}$ to LTF symbols. Receiving more LTF symbols than the value mapped from $N_{sts}$ can improve MIMO channel estimation, and better channel estimation results in better packet error rate (PER) and throughput performance. A PPDU may be sent by the non-AP STA 304-1 or 304-2 to the AP 302 as part of an association process between the AP 302 and non-STA 304-1 or 304-2. The PPDU may indicate in a PHY capabilities field a maximum number of LTF symbols that the non-AP STA 304-1 or 304-2 is able to receive in a non-OFDMA DL MU-MIMO transmission and the PPDU may not have any non-legacy LTF field or LTF symbols.

In one example, a capability subfield 326 of PPDU 336 may have an indication of a maximum number of LTF symbols that the non-AP STA 304-1 or 304-2 is able to receive in a non-OFDMA DL MU-MIMO PPDU, for all supported bandwidths. The PPDU 336 may also have a field 350 which indicates the maximum number of LTF symbols is associated with a non-OFDMA MU-MIMO communication. In another example, for each applicable bandwidth such as 80 MHz, 160 MHz/80+80 MHz, 240 MHz, or 320 MHz, a capability subfield 328-334 of PPDU 338 may have an indication of a maximum number of LTF symbols that the non-AP STA 304-1 or 304-2 is able to receive in a non-OFDMA DL MU-MIMO PPDU, for all applicable bandwidths. The PPDU 338 may also have a field 350 which indicates the maximum number of LTF symbols is associated with a non-OFDMA MU-MIMO communication.

In an example, one or more fields 314-322 may each have one bit where "0" indicates that a maximum of 4 LTF symbols that the non-AP STA 304-1 or 304-2 is able to receive while "1" indicates that a maximum of 8 LTF symbols that the non-AP STA 304-1 or 304-2 is able to receive. In another example, the field 314-322 may have one bit where "0" indicates that a maximum number of LTF symbols indicated by the maximum number of space-time streams $N_{sts}$ that the non-AP STA 304-1 or 304-2 is able to receive, while "1" indicates that a maximum of 8 LTF symbols that the non-AP STA 304 is able to receive. In another example, one or more fields 326-334 may have two bits where "00" indicates that a maximum of 4 LTF symbols that the non-AP STA 304-1 or 304-2 is able to receive while "01" indicates that a maximum of 8 LTF symbols that the non-AP STA 304-1 or 304-2 is able to receive. Bits "11" and "10" may be reserved. Further, in some examples, one or more fields 326-334 may have a bit which indicates whether the non-AP STA 304-1 or 304-2 is able to receive additional LTF symbols from that indicated by the space-time streams scheduled by the AP and indicated in a PPDU followed by the indication of the maximum number of LTF symbols that the non-AP STA 304-1 or 304-2 are able to transmit.

Figure 4:
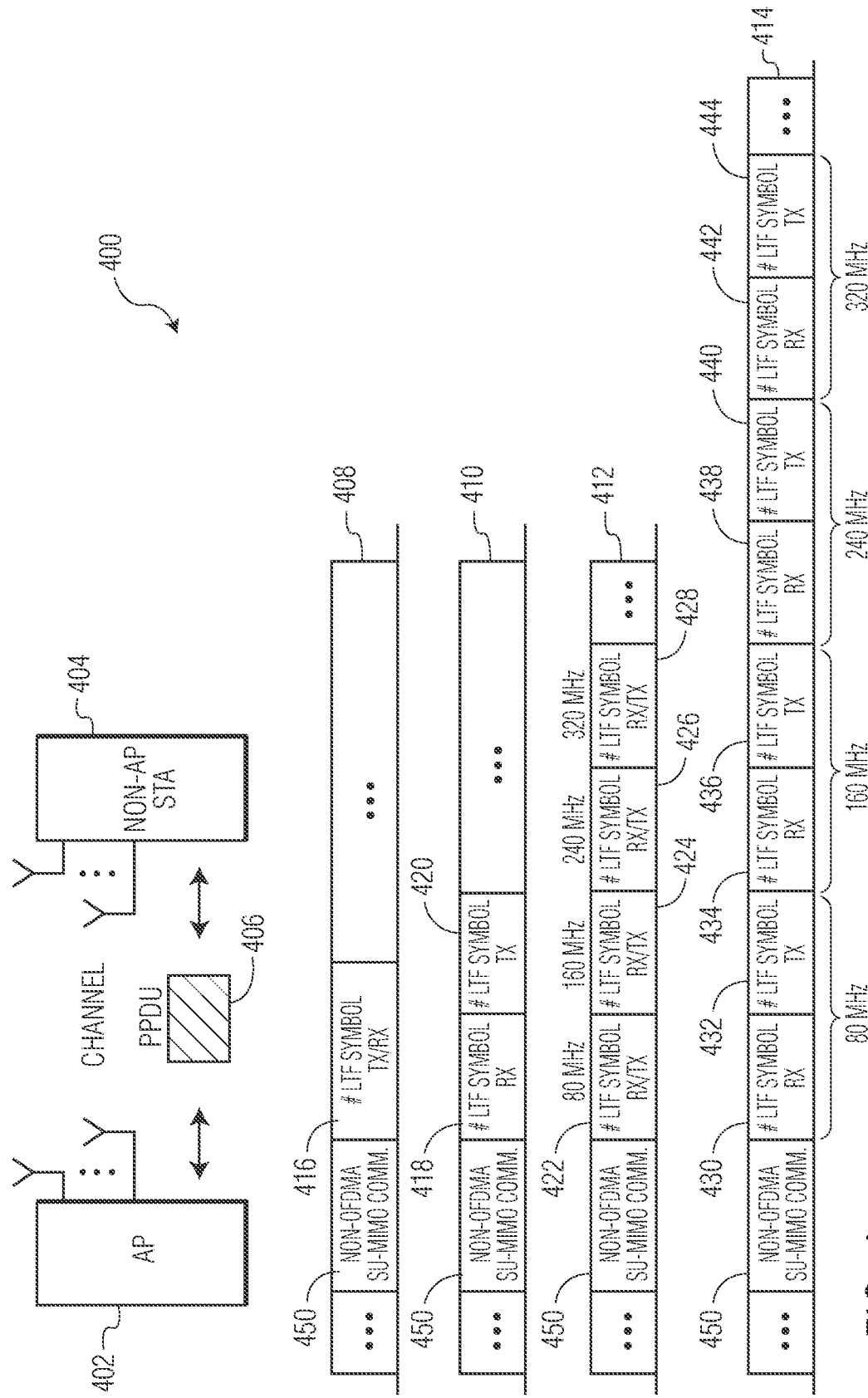
FIG. 4 is an example block diagram of an example communication system arranged to communicate a maximum number of LTF symbol transmit or receive capabilities for a full bandwidth non-OFDMA single user (SU) MIMO communication in accordance with exemplary embodiments.

FIG. 4 is an example block diagram of an example communication system 400 arranged to communicate a maximum number of LTF symbol transmit or receive capabilities for full bandwidth non-OFDMA single user (SU) MIMO communication in accordance with exemplary embodiments. The SU MIMO transmission may be an exchange of a PPDU 406 between one AP 402 and one non-AP STA 404. The maximum number of LTF symbols non-AP STA 404 can transmit or receive in a non-OFDMA SU MIMO communication of a PPDU 406 may be conventionally determined by a maximum number of space-time streams $N_{sts}$ supported in a transmit or receive direction of an SU PPDU mapping to a number of LTF symbols. The maximum number of space-time streams $N_{sts}$ may be indicated by the non-AP STA 404 in a management PPDU exchanged during an association between the AP 402 and non-AP STA 404 to exchange capabilities. The non-AP STA 404 may be able to transmit or receive more LTF symbols in the PPDU 406 than indicated by the mapping of the maximum number of space-time streams $N_{sts}$ supported to a number of LTF symbols or number of space-time streams scheduled by the AP and indicated in a PPDU. Transmitting/receiving more LTF symbols in the PPDU 406 than the value indicated by maximum number of space-time streams $N_{sts}$ supported or number of space-time streams scheduled by the AP and indicated in a PPDU can improve channel estimation, and better channel estimation results in better performance.

A PPDU 408 may be sent by the non-STA 404, e.g., as part of an association process between the AP 402 and non-STA 404. The PPDU may indicate in a PHY capabilities field a maximum number of LTF symbols the non-AP STA 404 supports transmitting or receiving in a non-OFDMA SU PPDU 406 and the PPDU 408 may not have any non-legacy LTF fields or LTF symbols. The PPDU 408 may also have a field 450 which indicates the maximum number of LTF symbols is associated with a non-OFDMA SU MIMO communication.

In one example, a capability subfield 416 of PPDU 408 may have an indication of a maximum number of LTF symbols that the non-AP STA 404 transmits or receives in a non-OFDMA SU PPDU 408 for all supported bandwidths. The PPDU 408 may also have a field 450 which indicates the maximum number of LTF symbols is associated with a non-OFDMA SU MIMO communication. In another example, two capability subfields 418, 420 of PPDU 410 may have an indication of a number of LTF symbols that the non-AP STA 404 transmits or receives in a non-OFDMA SU PPDU, for all supported bandwidths. The PPDU 410 may also have a field 450 which indicates the maximum number of LTF symbols is associated with a non-OFDMA SU MIMO communication. In yet another example, for each applicable bandwidth such as 80 MHz, 160 MHz/80+80 MHz, 240 MHz, or 320 MHz, capability subfields 422-428 of PPDU 412 may have an indication of a number of LTF symbols that the non-AP STA 404 transmits and receives in a non-OFDMA SU PPDU. The PPDU 412 may also have a field 450 which indicates the maximum number of LTF symbols is associated with a non-OFDMA SU MIMO communication. In another example, for each applicable bandwidth such as 80 MHz, 160 MHz/80+80 MHz, 240 MHz, or 320 MHz, capability subfields 430-444 of PPDU 414 may have an indication of a maximum number of LTF symbols that the non-AP STA 404 transmits or receives in a non-OFDMA SU PPDU. The PPDU 414 may also have a field 450 which indicates the maximum number of LTF symbols is associated with a non-OFDMA SU MIMO communication.

In an example, one or more fields 416-444 may have one bit where "0" indicates that a maximum of 4 LTF symbols that the non-AP STA 404 is able to transmit or receive while "1" indicates that a maximum of 8 LTF symbols that the non-AP STA 404 is able to transmit or receive. In another example, one or more fields 416-444 may have one bit where "0" indicates that a maximum number of LTF symbols indicated by the maximum number of space-time streams $N_{sts}$ that the non-AP STA 404 is able to transmit or receive, while "1" indicates that a maximum of 8 LTF symbols that the non-AP STA 404 is able to transmit or receive. In another example, the field 416-444 may have two bits where "00" indicates that a maximum of 4 LTF symbols that the non-AP STA 404 is able to transmit or receive while "01" indicates that a maximum of 8 LTF symbols that the non-AP STA 404 is able to transmit or receive. Bits "11" and "10" may be reserved. Further, in some examples, one or more fields 416-444 may have a bit which indicates whether the non-AP STA 404 is able to transmit or receive additional LTF symbols from that indicated by the space-time streams scheduled by the AP and indicated in a PPDU followed by the indication of the maximum number of LTF symbols that the non-AP STA 404 is able to transmit.

Figure 5:
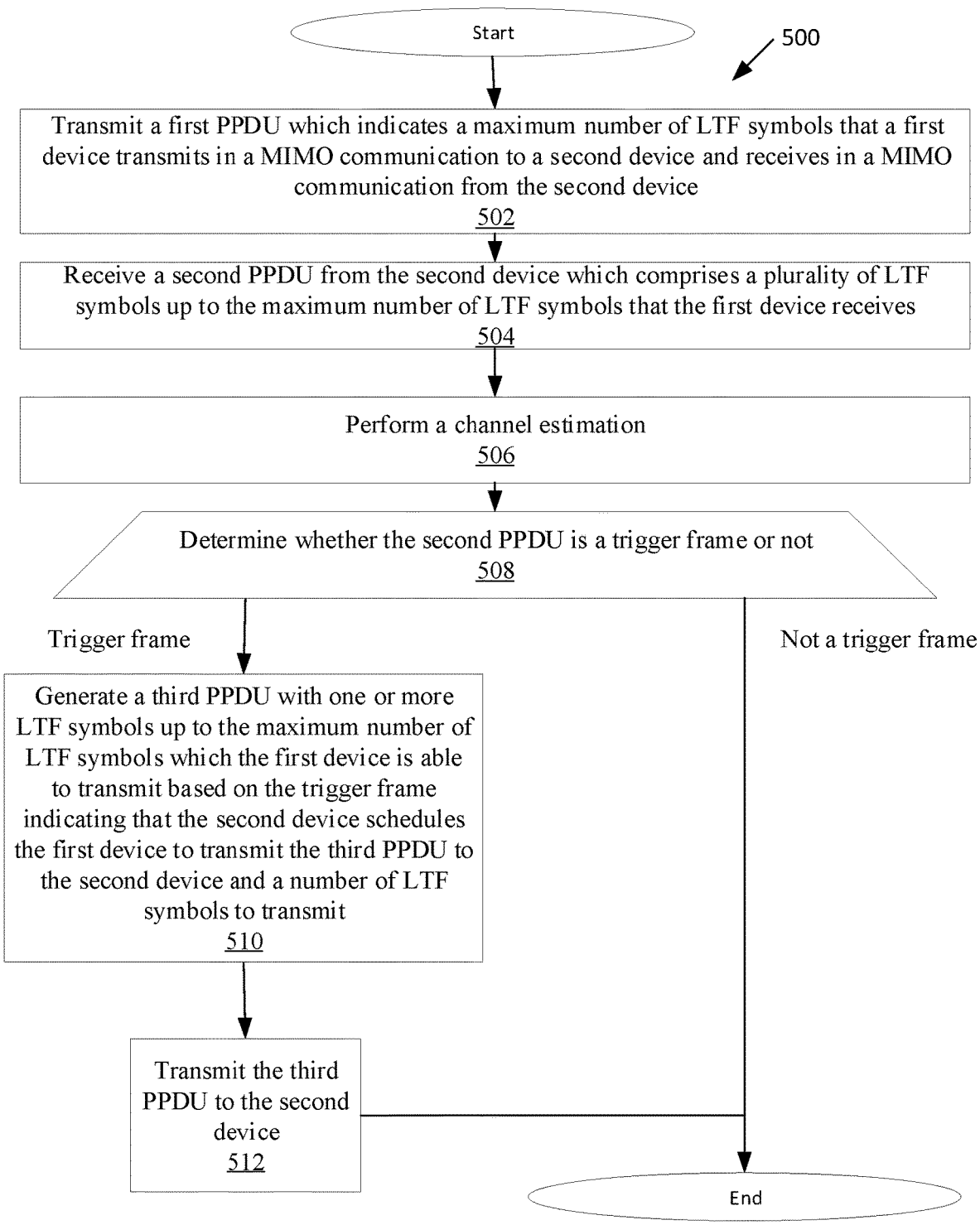
FIG. 5 is an example flow chart of an example method associated with an non-AP STA communicating a maximum number of LTF symbol transmit or receive capabilities to an AP in accordance with exemplary embodiments.

FIG. 5 is an example flow chart of an example method 500 associated with an non-AP STA communicating maximum LTF symbol transmit or receive capabilities to an AP in accordance with exemplary embodiments. At 502, a first PPDU is transmitted which indicates a maximum number of LTF symbols that a first device (non-AP STA) transmits in an MIMO communication (e.g., UL OFDMA, UL non-OFDMA MU-MIMO, transmit non-OFDMA SU) to a second device (AP) and receives in a MIMO communication (e.g., DL OFDMA, DL non-OFDMA MU-MIMO, receive non-OFDMA SU) from the second device. Further, the first PPDU may not have any non-legacy LTF fields or LTF symbols. The first PPDU may be transmitted during an association between the first device and the second device. At 504, a second PPDU is received from the second device which comprises a plurality of LTF symbols up to the maximum number of LTF symbols that the first device receives. At 506, a channel estimation is performed. The channel estimation may be performed based on the plurality of LTF symbols which are received to recover one or more fields of the second data unit. At 508, a determination is made whether the second PPDU is a trigger frame or not. The trigger frame may indicate that the second device schedules the first device to transmit a third PPDU to the second device. If the second PPDU is a trigger frame, then at 510, a third PPDU is generated with one or more LTF symbols up to the maximum number of LTF symbols which the first device is able to transmit based on the trigger frame indicating that the second device schedules the first device to transmit the third PPDU to the second device and a number of LTF symbols to transmit. At 512, the third PPDU is transmitted to the second device. The third PPDU may be a sounding PPDU or PPDU with a plurality of LTF symbols up to the maximum number of LTF symbols the first device supports and as indicated by the trigger frame to transmit. If the second PPDU is not a trigger frame, then the second PPDU indicates that the second device scheduled the first device to receive the second PPDU. The first device may not send any PPDU to the second device in response to the second PPDU or send a response such as a block acknowledgement of the second PPDU in an UL communication to the second device.

The term "number" as used herein may refer to an integer number such as an integer number (or maximum integer number) of LTF symbols or integer number (or maximum integer number) of space-time streams. The integer number may be indicated by a field in a PPDU. The number of LTF symbols or space-time streams is distinguishable from providing the actual LTF symbols in a field of a PPDU or transmitting or receiving the space-time streams.

In one embodiment, a method is disclosed. The method comprises: transmitting, by a first device, to a second device a first data unit which indicates a maximum number of long training field (LTF) symbols that the first device transmits and receives for a multiple input multiple output (MIMO) communication; receiving, from the second device, a second data unit which comprises a plurality of LTF symbols up to the maximum number of LTF symbols the first device receives indicated by the first data unit; performing a channel estimation based on the plurality of LTF symbols of the second data unit up to the maximum number of LTF symbols indicated by the first data unit to recover information in one or more fields of the second data unit; determining based on the one or more fields of the second data unit that the first device is to transmit a third data unit; and generating the third data unit with a plurality of LTF symbols up to the maximum number of LTF symbols the first device transmits indicated by the first data unit and transmitting the third data unit to the second device, the third data unit generated and transmitted based on the determination that the first device is to transmit the third data unit. In an embodiment, transmitting the first data unit comprises transmitting the indication of the maximum number of LTF symbols in a management PPDU to the second device which indicates capabilities of the first device, the second device being an access point and the first data unit not having any non-legacy LTF fields or non-legacy LTF symbols. In an embodiment, the first data unit comprises a field which indicates that the first device transmits and receives the maximum number of LTF symbols in an orthogonal frequency division multiple access (OFMDA) communication. In an embodiment, the first data unit comprises a respective fields which indicates that the first device transmits a maximum number of LTF symbols in an OFDMA transmission and receives a maximum number of LTF symbols in an OFDMA reception. In an embodiment, the first data unit comprises a field which indicates that the first device transmits and receives the maximum number of LTF symbols in an OFDMA communication for a bandwidth value. In an embodiment, the first data unit comprises a respective fields which indicates that the first device transmits a maximum number of LTF symbols in an OFDMA transmission for a first bandwidth value and receives a maximum number of LTF symbols in an OFDMA reception for a second bandwidth value. In an embodiment, the first data unit comprises a field which indicates that the first device transmits the maximum number of LTF symbols in a non-OFDMA multiple input multiple output (MIMO) multiple user (MU) uplink transmission. In an embodiment, the first data unit comprises a field which indicates that the first device transmits the maximum number of LTF symbols in a non-OFDMA MIMO MU uplink transmission for a bandwidth value. In an embodiment, the first data unit comprises a field which indicates that the first device receives the maximum number of LTF symbols in a non-OFDMA MIMO MU downlink transmission. In an embodiment, the first data unit comprises a field which indicates that the first device receives the maximum number of LTF symbols in a non-OFDMA MIMO MU downlink transmission for a bandwidth value. In an embodiment, the first data unit comprises a field which indicates that the first device transmits and receives the maximum number of LTF symbols in a non-OFDMA single user (SU) MIMO communication. In an embodiment, the first data unit comprises a respective fields which indicates that the first device transmits a maximum number of LTF symbols in a non-OFDMA SU MIMO transmission and receives a maximum number of LTF symbols in a non-OFDMA SU MIMO reception. In an embodiment, the first data unit comprises a field which indicates that the first device transmits and receives the maximum of LTF symbols in a non-OFDMA SU MIMO communication for a bandwidth value. In an embodiment, the first data unit comprises a respective fields which indicates that the first device transmits a maximum number of LTF symbols in a non-OFDMA SU MIMO transmission for a first bandwidth value and receives a maximum number of LTF symbols in a non-OFDMA SU MIMO reception for a second bandwidth value.

In another embodiment, a client station is disclosed. The client station comprises: a plurality of antennas configured for a multiple input multiple output (MIMO) communication; a network interface device which comprises a physical layer (PHY) unit configured to: transmit to an access point a first data unit which indicates a maximum number of long training field (LTF) symbols that the first device transmits and receives for the MIMO communication; receive, from the second device, a second data unit which comprises a plurality of LTF symbols up to the maximum number of LTF symbols the first device receives indicated by the first data unit; perform a channel estimation based on the plurality of LTF symbols of the second data unit up to the maximum number of LTF symbols indicated by the first data unit to recover information in one or more fields of the second data unit; determine based on the one or more fields of the second data unit that the first device is to transmit a third data unit; and generate the third data unit with a plurality of LTF symbols up to the maximum number of LTF symbols the first device transmits indicated by the first data unit and transmitting the third data unit to the second device, the third data unit generated and transmitted based on the determination that the first device is to transmit the third data unit. In an embodiment, the network interface device configured to transmit the first data unit comprises being further configured to transmit the maximum number of LTF symbols in a management PPDU to the access point which indicates capabilities of the first device and the first data unit does not have any non-legacy LTF or LTF symbols. In an embodiment, the first data unit indicates the maximum number of LTF symbols as one bit, wherein if the one bit is "0" then the maximum number of LTF symbols is indicated as four and if the one bit is "1" then the number of LTF symbols is indicated as eight. In an embodiment, the first data unit indicates the maximum number of LTF symbols as two bits, wherein if the two bits are "00" then the maximum number of LTF symbols is indicated as four and if the two bits are "01" then the maximum number of LTF symbols is indicated as eight, and the two bits are "11" and "10" to indicate reserved bits. In an embodiment, the two bits are preceded by one bit which indicates that the first data unit includes the indication of the maximum number of LTF symbols that the client station is able to transmit or receive. In an embodiment, the maximum number of LTF symbols that the client station transmits or receives is not mapped from a table which maps a maximum number of space-time streams supported to the maximum number of LTF symbols.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method comprising:
transmitting, by a first device, to a second device a first data unit which indicates a maximum number of long training field (LTF) symbols that the first device transmits and receives for a multiple input multiple output (MIMO) communication;
receiving, from the second device, a second data unit which comprises a plurality of LTF symbols up to the maximum number of LTF symbols the first device receives indicated by the first data unit;
performing a channel estimation based on the plurality of LTF symbols of the second data unit up to the maximum number of LTF symbols indicated by the first data unit to recover information in one or more fields of the second data unit;
determining based on the one or more fields of the second data unit that the first device is to transmit a third data unit; and
generating the third data unit with a plurality of LTF symbols up to the maximum number of LTF symbols the first device transmits indicated by the first data unit and transmitting the third data unit to the second device, the third data unit generated and transmitted based on the determination that the first device is to transmit the third data unit.

2. The method of claim 1, wherein transmitting the first data unit comprises transmitting the indication of the maximum number of LTF symbols in a management PPDU to the second device which indicates capabilities of the first device, the second device being an access point and the first data unit not having any non-legacy LTF fields or non-legacy LTF symbols.

3. The method of claim 1, wherein the first data unit comprises a field which indicates that the first device transmits and receives the maximum number of LTF symbols in an orthogonal frequency division multiple access (OFMDA) communication.

4. The method of claim 1, wherein the first data unit comprises a respective fields which indicates that the first device transmits a maximum number of LTF symbols in an OFDMA transmission and receives a maximum number of LTF symbols in an OFDMA reception.

5. The method of claim 1, wherein the first data unit comprises a field which indicates that the first device transmits and receives the maximum number of LTF symbols in an OFDMA communication for a bandwidth value.

6. The method of claim 1, wherein the first data unit comprises a respective fields which indicates that the first device transmits a maximum number of LTF symbols in an OFDMA transmission for a first bandwidth value and receives a maximum number of LTF symbols in an OFDMA reception for a second bandwidth value.

7. The method of claim 1, wherein the first data unit comprises a field which indicates that the first device transmits the maximum number of LTF symbols in a non-OFDMA multiple input multiple output (MIMO) multiple user (MU) uplink transmission.

8. The method of claim 1, wherein the first data unit comprises a field which indicates that the first device transmits the maximum number of LTF symbols in a non-OFDMA MIMO MU uplink transmission for a bandwidth value.

9. The method of claim 1, wherein the first data unit comprises a field which indicates that the first device receives the maximum number of LTF symbols in a non-OFDMA MIMO MU downlink transmission.

10. The method of claim 1, wherein the first data unit comprises a field which indicates that the first device receives the maximum number of LTF symbols in a non-OFDMA MIMO MU downlink transmission for a bandwidth value.

11. The method of claim 1, wherein the first data unit comprises a field which indicates that the first device transmits and receives the maximum number of LTF symbols in a non-OFDMA single user (SU) MIMO communication.

12. The method of claim 1, wherein the first data unit comprises a respective fields which indicates that the first device transmits a maximum number of LTF symbols in a non-OFDMA SU MIMO transmission and receives a maximum number of LTF symbols in a non-OFDMA SU MIMO reception.

13. The method of claim 1, wherein the first data unit comprises a field which indicates that the first device transmits and receives the maximum of LTF symbols in a non-OFDMA SU MIMO communication for a bandwidth value.

14. The method of claim 1, wherein the first data unit comprises a respective fields which indicates that the first device transmits a maximum number of LTF symbols in a non-OFDMA SU MIMO transmission for a first bandwidth value and receives a maximum number of LTF symbols in a non-OFDMA SU MIMO reception for a second bandwidth value.

15. A client station comprising:
a plurality of antennas configured for a multiple input multiple output (MIMO) communication;
a network interface device which comprises a physical layer (PHY) unit configured to:
transmit to an access point a first data unit which indicates a maximum number of long training field (LTF) symbols that the first device transmits and receives for the MIMO communication;
receive, from the second device, a second data unit which comprises a plurality of LTF symbols up to the maximum number of LTF symbols the first device receives indicated by the first data unit;
perform a channel estimation based on the plurality of LTF symbols of the second data unit up to the maximum number of LTF symbols indicated by the first data unit to recover information in one or more fields of the second data unit;

determine based on the one or more fields of the second data unit that the first device is to transmit a third data unit; and generate the third data unit with a plurality of LTF symbols up to the maximum number of LTF symbols the first device transmits indicated by the first data unit and transmitting the third data unit to the second device, the third data unit generated and transmitted based on the determination that the first device is to transmit the third data unit.

16. The client station of claim 15, wherein the network interface device configured to transmit the first data unit comprises being further configured to transmit the maximum number of LTF symbols in a management PPDU to the access point which indicates capabilities of the first device and the first data unit does not have any non-legacy LTF or LTF symbols.

17. The client station of claim 15, wherein the first data unit indicates the maximum number of LTF symbols as one bit, wherein if the one bit is "0" then the maximum number of LTF symbols is indicated as four and if the one bit is "1" then the number of LTF symbols is indicated as eight.

18. The client station of claim 15, wherein the first data unit indicates the maximum number of LTF symbols as two bits, wherein if the two bits are "00" then the maximum number of LTF symbols is indicated as four and if the two bits are "01" then the maximum number of LTF symbols is indicated as eight, and the two bits are "11" and "10" to indicate reserved bits.

19. The client station of claim 18, wherein the two bits are preceded by one bit which indicates that the first data unit includes the indication of the maximum number of LTF symbols that the client station is able to transmit or receive.

20. The client station of claim 15, wherein the maximum number of LTF symbols that the client station transmits or receives is not mapped from a table which maps a maximum number of space-time streams supported to the maximum number of LTF symbols.

* * * * *